United States Patent
Jin et al.

(10) Patent No.: US 10,156,197 B1
(45) Date of Patent: Dec. 18, 2018

(54) MODEL PREDICTIVE CONTROL SYSTEMS AND METHODS FOR INCREASING COMPUTATIONAL EFFICIENCY

(71) Applicant: GM Global Technology Operations LLC, Detroit, MI (US)

(72) Inventors: Ning Jin, Novi, MI (US); Ruixing Long, Windsor (CA); Nicola Pisu, Canton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/624,786

(22) Filed: Jun. 16, 2017

(51) Int. Cl.
| | |
|---|---|
| *F02D 41/14* | (2006.01) |
| *F02B 37/18* | (2006.01) |
| *F02D 9/08* | (2006.01) |
| *F02D 13/02* | (2006.01) |
| *F02D 41/00* | (2006.01) |
| *G05B 19/042* | (2006.01) |

(52) U.S. Cl.
CPC ........ *F02D 41/1401* (2013.01); *F02B 37/186* (2013.01); *F02D 9/08* (2013.01); *F02D 13/0238* (2013.01); *F02D 13/0249* (2013.01); *F02D 41/0077* (2013.01); *G05B 19/0426* (2013.01); *F02D 2041/1412* (2013.01); *G05B 2219/42058* (2013.01)

(58) Field of Classification Search
CPC ........ F02D 41/14; F02D 41/1401; F02D 9/08; F02D 13/02; F02D 13/0238; F02D 13/0249; F02B 37/186; G05B 19/04; G05B 19/0426

USPC ................. 701/101–103, 106–108, 110–115; 123/478–481, 568.18–568.2
See application file for complete search history.

(56) References Cited

U.S. PATENT DOCUMENTS

| | | | |
|---|---|---|---|
| 4,161,929 | A | 7/1979 | Kobashi et al. |
| 4,653,449 | A | 3/1987 | Kamei et al. |
| 5,070,846 | A | 12/1991 | Dudek et al. |
| 5,101,786 | A | 4/1992 | Kamio et al. |
| 5,268,835 | A | 12/1993 | Miyagaki et al. |
| 5,270,935 | A | 12/1993 | Dudek et al. |
| 7,614,384 | B2 | 11/2009 | Livshiz et al. |
| 8,473,179 | B2 | 6/2013 | Whitney et al. |
| 9,599,053 | B2 | 3/2017 | Long et al. |
| 9,605,615 | B2 | 3/2017 | Long et al. |
| 2004/0034460 | A1* | 2/2004 | Folkerts .............. B60W 30/188 701/54 |
| 2014/0174413 | A1* | 6/2014 | Huang .................... F02B 47/08 123/568.18 |
| 2014/0278001 | A1* | 9/2014 | Miller ................ F02D 41/0097 701/103 |
| 2016/0237932 | A1 | 8/2016 | Long et al. |

* cited by examiner

*Primary Examiner* — John Kwon
*Assistant Examiner* — Johnny H Hoang

(57) ABSTRACT

A method for controlling an actuator system of a motor vehicle includes utilizing a model predictive control (MPC) module with an MPC solver to determine optimal positions of a plurality of actuators subject to constraints, optimizing a cost function for a set of actuator duty cycles for controlling positions of the plurality of actuators, determining if the MPC solver has determined optimal actuator positions for the plurality of actuators, and applying a linear quadratic regulator (LQR) solution if the MPC solver fails to determine optimal actuator positions for the plurality of actuators.

20 Claims, 5 Drawing Sheets

MODEL PREDICTIVE CONTROL SYSTEMS AND METHODS FOR INCREASING COMPUTATIONAL EFFICIENCY

INTRODUCTION

The present disclosure relates to internal combustion engines and more particularly to engine control systems and methods for vehicles.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. In compression-ignition engines, compression in the cylinders combusts the air/fuel mixture provided to the cylinders. Spark timing and air flow may be the primary mechanisms for adjusting the torque output of spark-ignition engines, while fuel flow may be the primary mechanism for adjusting the torque output of compression-ignition engines.

Engine control systems have been developed to control engine output torque to achieve a desired torque. Traditional engine control systems, however, do not control the engine output torque as accurately as desired. For example, some response outputs that are used in feedback loops for control variables do not update quickly enough to provide close to real time feedback to allow for accurate commands. Further, traditional engine control systems do not provide a rapid response to control signals or coordinate engine torque control among various devices that affect the engine output torque. Thus, while current engine control systems achieve their intended purpose, there is a need for a new and improved system and method for engine control that includes faster response variables and improved control accuracy.

SUMMARY

In one aspect of the present disclosure, a method for controlling an actuator system of a motor vehicle includes utilizing a model predictive control (MPC) module with an MPC solver to determine optimal positions of a plurality of actuators subject to constraints, optimizing a cost function for a set of actuator duty cycles for controlling positions of the plurality of actuators, determining if the MPC solver has determined optimal actuator positions for the plurality of actuators, and applying a linear quadratic regulator (LQR) solution if the MPC solver fails to determine optimal actuator positions for the plurality of actuators.

In another aspect of the present disclosure, the MPC solver solves a sequence of quadratic problems refining actuator movements over a control horizon for the plurality of actuators.

In yet another aspect of the present disclosure, the MPC module further includes a prediction module determining future state values of the plurality of actuators.

In yet another aspect of the present disclosure, optimizing a cost function further includes minimizing an actuator performance criterion over a prediction horizon for each control loop.

In yet another aspect of the present disclosure, applying an LQR solution further includes applying the LQR solution when the MPC solver fails to determine optimal actuator positions within a predetermined amount of time.

In yet another aspect of the present disclosure, the predetermined amount of time is approximately 25 ms.

In yet another aspect of the present disclosure, the MPC module further includes an optimization module setting multiple constraints including constraints for at least each of a throttle valve, an exhaust gas recycling (EGR) valve, a wastegate, an intake cam phaser, an exhaust cam phaser, of the plurality of actuators.

In yet another aspect of the present disclosure, the optimization module adjusts the multiple constraints to narrow operational ranges for the plurality of actuators when an LQR solution falls outside the operational ranges.

In yet another aspect of the present disclosure, the optimization module applies an LQR solution for a current control loop when the MPC solver fails to determine optimal actuator positions for the plurality of actuators.

In yet another aspect of the present disclosure, the optimization module applies the LQR solution for a future control loop when the MPC solver fails to determine optimal actuator positions for the plurality of actuators within the constraints for the plurality of actuators.

In yet another aspect of the present disclosure, the optimization module applies the LQR solution for a plurality of future control loops when the MPC solver fails to determine optimal actuator positions for the plurality of actuators within the constraints for the plurality of actuators.

In yet another aspect of the present disclosure, a method for controlling an actuator system within a motor vehicle includes utilizing an actuator control system that provides a desired output for at least a first actuator of the actuator system, converting within a first conversion module the desired output to a desired first actuator position, converting within a second conversion module the desired first actuator position to a target first actuator position, utilizing a model predictive control (MPC) module having an MPC solver that determines optimal first actuator positions based on a current position of the first actuator, determining within a prediction module future state values of the actuator control system using a mathematical model of the actuator system, determining within a cost module a first cost for a first possible set of MPC target actuator duty cycle values, identifying within a control module optimal sets of target actuator motor duty cycle values for the MPC module, determining if the MPC solver has determined optimal actuator motor duty cycle values for the plurality of actuators, and applying a Linear Quadratic Regulator (LQR) solution for the target actuator motor duty cycle values if the MPC solver fails to determine optimal actuator motor duty cycles for the plurality of actuators, and the MPC module controls operation of an actuator duty cycle to achieve target actuator positions based on target actuator motor duty cycle values.

In yet another aspect of the present disclosure, utilizing an MPC module further includes determining a desired output for at least the first actuator.

In yet another aspect of the present disclosure, the MPC solver includes a Quadratic Programming (QP) solver and a Kalman filter.

In yet another aspect of the present disclosure, the applying a Linear Quadratic Regulator (LQR) solution further includes applying the LQR solution when the MPC solver fails to determine optimal actuator positions within a predetermined amount of time.

In yet another aspect of the present disclosure, the MPC module further includes an optimization module setting multiple constraints including constraints for at least each of a throttle valve, an exhaust gas recycling (EGR) valve, a wastegate, an intake cam phaser, and an exhaust cam phaser, of the actuator system.

In yet another aspect of the present disclosure, the optimization module adjusts the constraints to narrow operational ranges for the plurality of actuators when an LQR solution falls outside the operational ranges.

In yet another aspect of the present disclosure, when the MPC solver fails to determine optimal actuator motor duty cycles for the plurality of actuators, the optimization module applies the LQR solution for one of: a current control loop, a single future control loop, or a plurality of future control loops.

In yet another aspect of the present disclosure, the MPC module further includes a plurality of MPC controllers, and the actuator control system further comprises a plurality of actuators, and each of the plurality of MPC controllers controls a distinct actuator of the plurality of actuators.

In yet another aspect of the present disclosure, an actuator control system for a motor vehicle using model predictive control (MPC) includes an MPC module with an MPC solver having a first logic that determines current system constraints based on a current position of an actuator, the MPC solver having a second logic that determines a cost for a set of actuator duty cycles for controlling the position of the actuator, the MPC solver having a third logic that determines if the MPC solver has a solution for the current system constraints, the MPC solver having a fourth logic for applying a Linear Quadratic Regulator (LQR) solution if the MPC solver does not have a solution for the current system constraints, and the MPC solver having a fifth logic for constraining the LQR solution to physical and programmed limitations of the actuator system. The MPC solver includes a Kalman filter, and a quadratic programming (QP) problem solver.

Further objects, aspects and advantages of the present invention will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way.

The present disclosure will become more fully understood from the detailed description and the accompanying drawings, wherein.

DETAILED DESCRIPTION

The following description is merely exemplary in nature and is not intended to limit the present disclosure, application, or uses.

As is described in U.S. Pat. Nos. 9,599,053 and 9,605,615, hereby incorporated by reference in their entirety, an engine control module (ECM) controls torque output of an engine. More specifically, the ECM controls actuators of the engine based on target values, respectively, determined based on a requested amount of torque. For example, the ECM controls intake and exhaust camshaft phasing based on target intake and exhaust phaser angles, a throttle valve based on a target throttle opening, an exhaust gas recirculation (EGR) valve based on a target EGR opening, and a wastegate of a turbocharger based on a target wastegate duty cycle.

The ECM could determine the target values individually using multiple single input single output (SISO) controllers, such as proportional integral derivative (PID) controllers. However, when multiple SISO controllers are used, the target values may be set to maintain system stability at the expense of possible fuel consumption decreases. Additionally, calibration and design of the individual SISO controllers may be costly and time consuming.

The ECM of the present disclosure generates the target values using model predictive control (MPC). More specifically, the ECM determines optimum target values by iteratively solving a constrained quadratic optimization problem each control loop. The ECM of the present disclosure solves the optimization problem in a computationally efficient manner.

Figure 1:
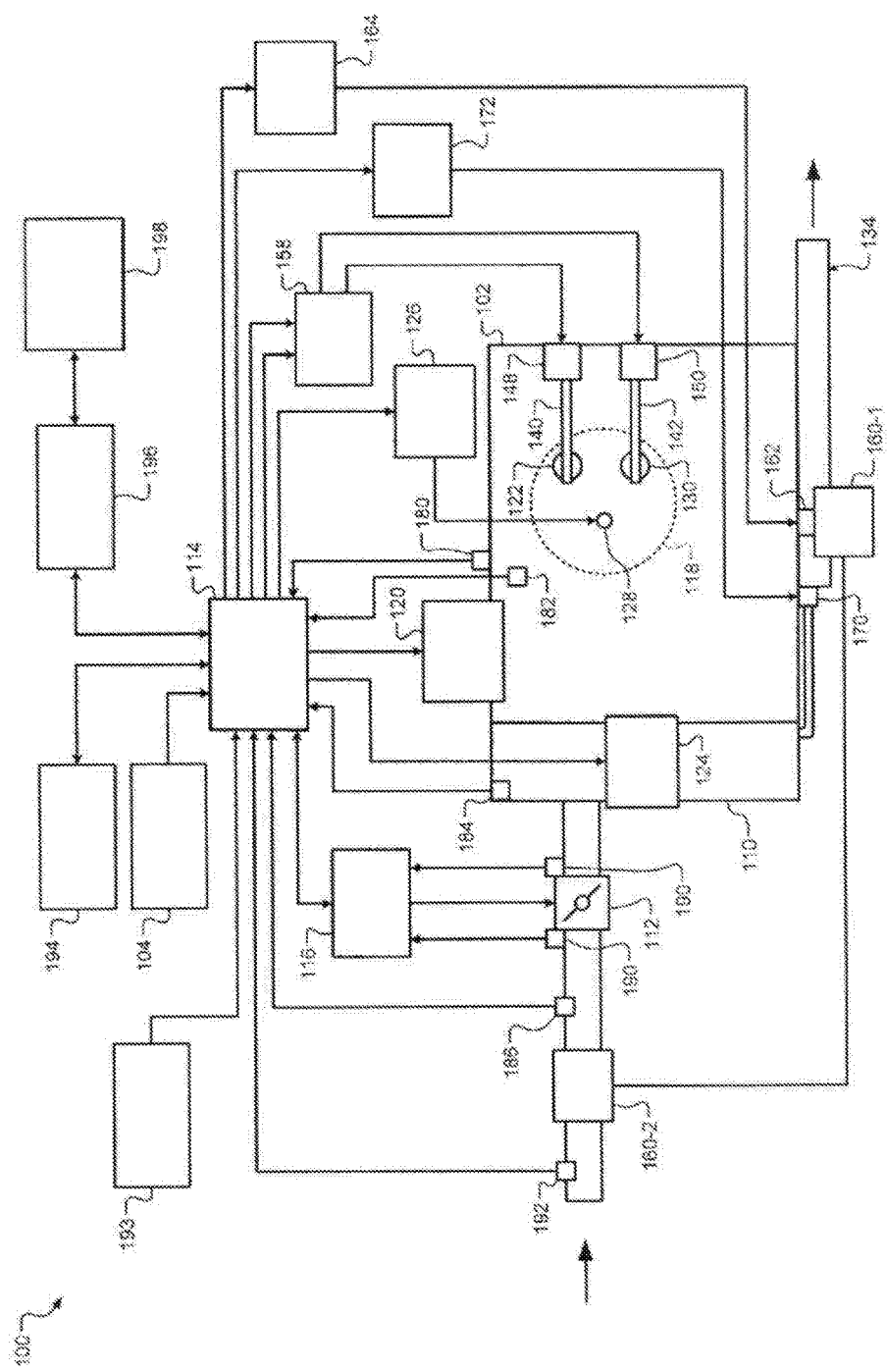
FIG. 1 is a functional block diagram of an example engine system according to an aspect of the present disclosure.

Referring now to FIG. 1, a functional block diagram of an example engine system 100 is presented. The engine system 100 includes an engine 102 that combusts an air/fuel mixture to produce drive torque for a vehicle based on driver input from a driver input module 104. The engine 102 may be a gasoline spark ignition internal combustion engine.

Air is drawn into an intake manifold 110 through a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

The engine 102 may operate using a four-stroke cycle. The four strokes, described below, may be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a target air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. A spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. Generating spark may be referred to as a firing event. The spark actuator module 126 may have the ability to vary the timing of the spark for each firing event. The spark actuator module 126 may vary the spark timing for a next firing event when the spark timing is changed between a last firing event and the next firing event. The spark actuator module 126 may halt provision of spark to deactivated cylinders.

During the combustion stroke, the combustion of the air/fuel mixture drives the piston away from TDC, thereby driving the crankshaft. The combustion stroke may be defined as the time between the piston reaching TDC and the time at which the piston reaches bottom dead center (BDC). During the exhaust stroke, the piston begins moving away from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). In various other implementations, the intake valve 122 and/or the exhaust valve 130 may be controlled by devices other than camshafts, such as camless valve actuators. The cylinder actuator module 120 may deactivate the cylinder 118 by disabling opening of the intake valve 122 and/or the exhaust valve 130.

The time when the intake valve 122 is opened may be varied with respect to piston TDC by an intake cam phaser 148. The time when the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift (not shown) may also be controlled by the phaser actuator module 158.

The engine system 100 may include a turbocharger that includes a hot turbine 160-1 that is powered by hot exhaust gases flowing through the exhaust system 134. The turbocharger also includes a cold air compressor 160-2 that is driven by the turbine 160-1. The compressor 160-2 compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) provided by the turbocharger. A boost actuator module 164 may control the boost of the turbocharger by controlling opening of the wastegate 162. In various implementations, two or more turbochargers may be implemented and may be controlled by the boost actuator module 164.

An air cooler (not shown) may transfer heat from the compressed air charge to a cooling medium, such as engine coolant or air. An air cooler that cools the compressed air charge using engine coolant may be referred to as an intercooler. An air cooler that cools the compressed air charge using air may be referred to as a charge air cooler. The compressed air charge may receive heat, for example, via compression and/or from components of the exhaust system 134. Although shown separated for purposes of illustration, the turbine 160-1 and the compressor 160-2 may be attached to each other, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbocharger's turbine 160-1. The EGR valve 170 may be controlled by an EGR actuator module 172 based on signals from the ECM 114.

A position of the crankshaft may be measured using a crankshaft position sensor 180. A rotational speed of the crankshaft (an engine speed) may be determined based on the crankshaft position. A temperature of the engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. An ambient temperature of air being drawn into the engine 102 may be measured using an intake air temperature (IAT) sensor 192. The engine system 100 may also include one or more other sensors 193, such as an ambient humidity sensor, one or more knock sensors, a compressor outlet pressure sensor and/or a throttle inlet pressure sensor, a wastegate position sensor, an EGR position sensor, and/or one or more other suitable sensors. The ECM 114 may use signals from the sensors to make control decisions for the engine system 100.

The ECM 114 may communicate with a transmission control module 194 to coordinate shifting gears in a transmission (not shown). For example, the ECM 114 may reduce engine torque during a gear shift. The ECM 114 may communicate with a hybrid control module 196 to coordinate operation of the engine 102 and an electric motor 198.

The electric motor 198 may also function as a generator, and may be used to produce electrical energy for use by vehicle electrical systems and/or for storage in a battery. In various implementations, various functions of the ECM 114, the transmission control module 194, and the hybrid control module 196 may be integrated into one or more modules.

Each system that varies an engine parameter may be referred to as an engine actuator. For example, the throttle actuator module 116 may adjust opening of the throttle valve 112 to achieve a target throttle opening area. The spark actuator module 126 controls the spark plugs to achieve a target spark timing relative to piston TDC. The fuel actuator module 124 controls the fuel injectors to achieve target fueling parameters. The phaser actuator module 158 may control the intake and exhaust cam phasers 148 and 150 to achieve target intake and exhaust cam phaser angles, respectively. The EGR actuator module 172 may control the EGR valve 170 to achieve a target EGR opening area. The boost actuator module 164 controls the wastegate 162 to achieve a target wastegate opening area. The cylinder actuator module 120 controls cylinder deactivation to achieve a target number of activated or deactivated cylinders.

The ECM 114 generates the target values for the engine actuators to cause the engine 102 to generate a target engine output torque. The ECM 114 generates the target values for the engine actuators using model predictive control, as discussed further below.

Figure 2:
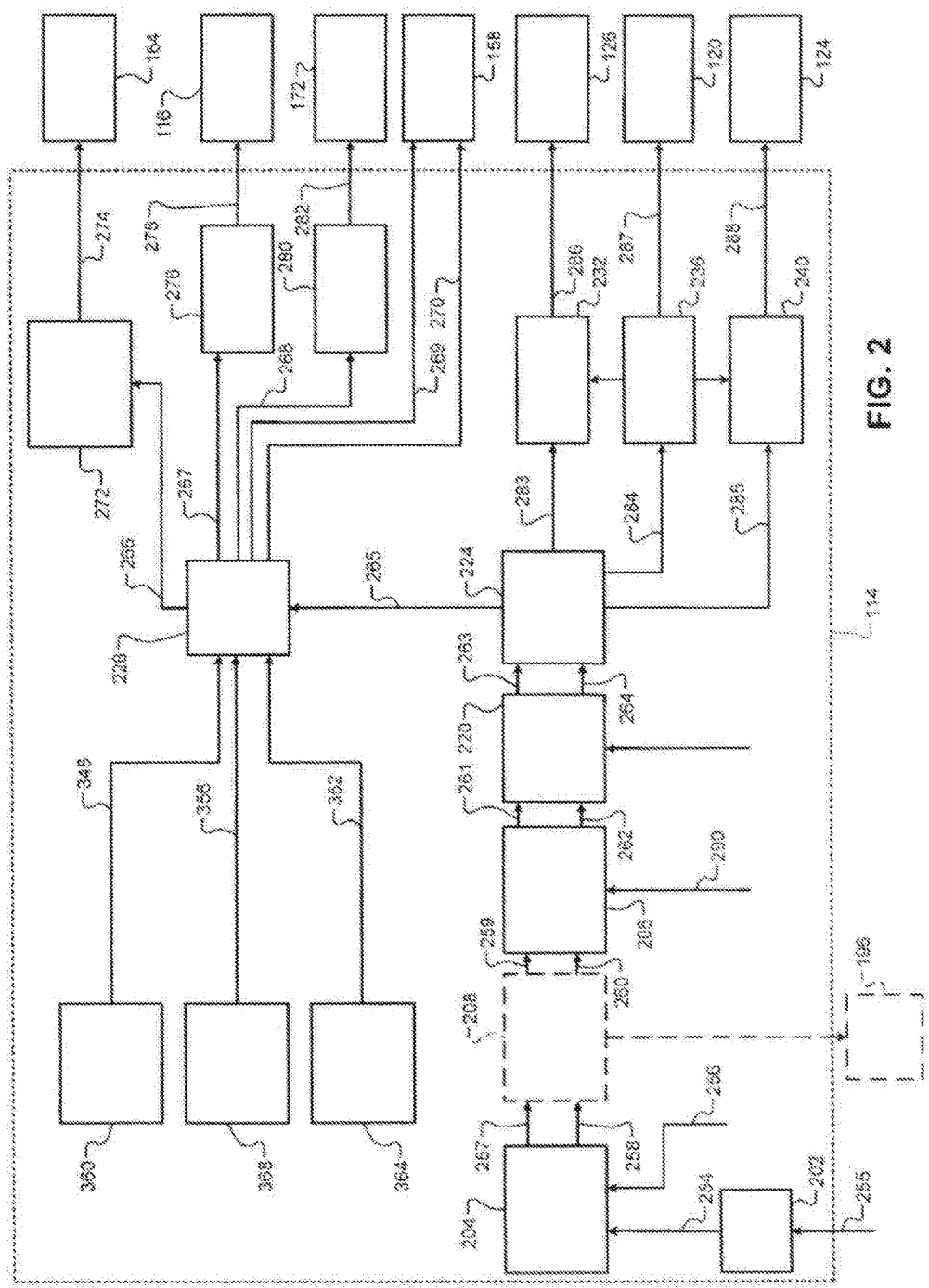
FIG. 2 is a functional block diagram of an example engine control system according to an aspect of the present disclosure.

Referring now to FIG. 2, a functional block diagram of an example engine control system is presented. An example implementation of the ECM 114 includes a driver torque module 202, an axle torque arbitration module 204, and a propulsion torque arbitration module 206. The ECM 114 may include a hybrid optimization module 208. The ECM 114 also includes a reserves/loads module 220, a torque requesting module 224, an air control module 228, a spark control module 232, a cylinder control module 236, and a fuel control module 240.

The driver torque module 202 may determine a driver torque request 254 based on a driver input 255 from the driver input module 104. The driver input 255 may be based on, for example, a position of an accelerator pedal and a position of a brake pedal. The driver input 255 may also be based on cruise control, which may be an adaptive cruise control system that varies vehicle speed to maintain a predetermined following distance. The driver torque module 202 may store one or more mappings of accelerator pedal position to target torque and may determine the driver torque request 254 based on a selected one of the mappings.

An axle torque arbitration module 204 arbitrates between the driver torque request 254 and other axle torque requests 256. Axle torque (torque at the wheels) may be produced by various sources including an engine and/or an electric motor. For example, the axle torque requests 256 may include a torque reduction requested by a traction control system when positive wheel slip is detected. Positive wheel slip occurs when axle torque overcomes friction between the wheels and the road surface, and the wheels begin to slip against the road surface. The axle torque requests 256 may also include a torque increase request to counteract negative wheel slip, where a tire of the vehicle slips in the other direction with respect to the road surface because the axle torque is negative.

The axle torque requests 256 may also include brake management requests and vehicle over-speed torque requests. Brake management requests may reduce axle torque to ensure that the axle torque does not exceed the ability of the brakes to hold the vehicle when the vehicle is stopped. Vehicle over-speed torque requests may reduce the axle torque to prevent the vehicle from exceeding a predetermined speed. The axle torque requests 256 may also be generated by vehicle stability control systems.

The axle torque arbitration module 204 outputs a predicted torque request 257 and an immediate torque request 258 based on the results of arbitrating between the received torque requests 254 and 256. As described below, the predicted and immediate torque requests 257 and 258 from the axle torque arbitration module 204 may selectively be adjusted by other modules of the ECM 114 before being used to control the engine actuators.

In general terms, the immediate torque request 258 may be an amount of currently desired axle torque, while the predicted torque request 257 may be an amount of axle torque that may be needed on short notice. The ECM 114 controls the engine system 100 to produce an axle torque equal to the immediate torque request 258. However, different combinations of target values may result in the same axle torque. The ECM 114 may therefore adjust the target values to enable a faster transition to the predicted torque request 257, while still maintaining the axle torque at the immediate torque request 258.

In various implementations, the predicted torque request 257 may be set based on the driver torque request 254. The immediate torque request 258 may be set to less than the predicted torque request 257 under some circumstances, such as when the driver torque request 254 is causing wheel slip on an icy surface. In such a case, a traction control system (not shown) may request a reduction via the immediate torque request 258, and the ECM 114 reduces the engine torque output to the immediate torque request 258. However, the ECM 114 performs the reduction so the engine system 100 can quickly resume producing the predicted torque request 257 once the wheel slip stops.

In general terms, the difference between the immediate torque request 258 and the (generally higher) predicted torque request 257 can be referred to as a torque reserve. The torque reserve may represent the amount of additional torque (above the immediate torque request 258) that the engine system 100 can begin to produce with minimal delay. Fast engine actuators are used to increase or decrease current axle torque with minimal delay. Fast engine actuators are defined in contrast with slow engine actuators.

In general terms, fast engine actuators can change the axle torque more quickly than slow engine actuators. Slow actuators may respond more slowly to changes in their respective target values than fast actuators do. For example, a slow actuator may include mechanical components that require time to move from one position to another in response to a change in target value. A slow actuator may also be characterized by the amount of time it takes for the axle torque to begin to change once the slow actuator begins to implement the changed target value. Generally, this amount of time will be longer for slow actuators than for fast actuators. In addition, even after beginning to change, the axle torque may take longer to fully respond to a change in a slow actuator.

For example only, the spark actuator module 126 may be a fast actuator. Spark-ignition engines may combust fuels including, for example, gasoline and ethanol, by applying a spark. By way of contrast, the throttle actuator module 116 may be a slow actuator.

For example, as described above, the spark actuator module 126 can vary the spark timing for a next firing event when the spark timing is changed between a last firing event and the next firing event. By way of contrast, changes in throttle opening take longer to affect engine output torque. The throttle actuator module 116 changes the throttle opening by adjusting the angle of the blade of the throttle valve 112. Therefore, when the target value for opening of the throttle valve 112 is changed, there is a mechanical delay as the throttle valve 112 moves from its previous position to a new position in response to the change. In addition, air flow changes based on the throttle opening are subject to air transport delays in the intake manifold 110. Further, increased air flow in the intake manifold 110 is not realized as an increase in engine output torque until the cylinder 118 receives additional air in the next intake stroke, compresses the additional air, and commences the combustion stroke.

Using these actuators as an example, a torque reserve can be created by setting the throttle opening to a value that would allow the engine 102 to produce the predicted torque request 257. Meanwhile, the spark timing can be set based on the immediate torque request 258, which is less than the predicted torque request 257. Although the throttle opening generates enough air flow for the engine 102 to produce the predicted torque request 257, the spark timing is retarded (which reduces torque) based on the immediate torque request 258. The engine output torque will therefore be equal to the immediate torque request 258.

When additional torque is needed, the spark timing can be set based on the predicted torque request 257 or a torque between the predicted and immediate torque requests 257 and 258. By the following firing event, the spark actuator module 126 may return the spark timing to an optimum value, which allows the engine 102 to produce the full engine output torque achievable with the air flow already present. The engine output torque may therefore be quickly increased to the predicted torque request 257 without experiencing delays from changing the throttle opening.

The axle torque arbitration module 204 may output the predicted torque request 257 and the immediate torque request 258 to a propulsion torque arbitration module 206. In various implementations, the axle torque arbitration module 204 may output the predicted and immediate torque requests 257 and 258 to the hybrid optimization module 208.

The hybrid optimization module 208 may determine how much torque should be produced by the engine 102 and how much torque should be produced by the electric motor 198. The hybrid optimization module 208 then outputs modified predicted and immediate torque requests 259 and 260, respectively, to the propulsion torque arbitration module 206. In various implementations, the hybrid optimization module 208 may be implemented in the hybrid control module 196.

The predicted and immediate torque requests received by the propulsion torque arbitration module 206 are converted from an axle torque domain (torque at the wheels) into a propulsion torque domain (torque at the crankshaft). This conversion may occur before, after, as part of, or in place of the hybrid optimization module 208.

The propulsion torque arbitration module 206 arbitrates between propulsion torque requests 290, including the converted predicted and immediate torque requests. The propulsion torque arbitration module 206 generates an arbitrated predicted torque request 261 and an arbitrated immediate torque request 262. The arbitrated torque requests 261 and 262 may be generated by selecting a winning request from among received torque requests. Alternatively or additionally, the arbitrated torque requests may be generated by modifying one of the received requests based on another one or more of the received torque requests.

For example, the propulsion torque requests 290 may include torque reductions for engine over-speed protection, torque increases for stall prevention, and torque reductions requested by the transmission control module 194 to accommodate gear shifts. The propulsion torque requests 290 may also result from clutch fuel cutoff, which reduces the engine output torque when the driver depresses the clutch pedal in a manual transmission vehicle to prevent a flare in engine speed.

The propulsion torque requests 290 may also include an engine shutoff request, which may be initiated when a critical fault is detected. For example only, critical faults may include detection of vehicle theft, a stuck starter motor, electronic throttle control problems, and unexpected torque increases. In various implementations, when an engine shutoff request is present, arbitration selects the engine shutoff request as the winning request. When the engine shutoff request is present, the propulsion torque arbitration module 206 may output zero as the arbitrated predicted and immediate torque requests 261 and 262.

In various implementations, an engine shutoff request may simply shut down the engine 102 separately from the arbitration process. The propulsion torque arbitration module 206 may still receive the engine shutoff request so that, for example, appropriate data can be fed back to other torque requestors. For example, all other torque requestors may be informed that they have lost arbitration.

The reserves/loads module 220 receives the arbitrated predicted and immediate torque requests 261 and 262. The reserves/loads module 220 may adjust the arbitrated predicted and immediate torque requests 261 and 262 to create a torque reserve and/or to compensate for one or more loads. The reserves/loads module 220 then outputs adjusted predicted and immediate torque requests 263 and 264 to the torque requesting module 224.

For example only, a catalyst light-off process or a cold start emissions reduction process may require retarded spark timing. The reserves/loads module 220 may therefore increase the adjusted predicted torque request 263 above the adjusted immediate torque request 264 to create retarded spark for the cold start emissions reduction process. In another example, the air/fuel ratio of the engine and/or the mass air flow may be directly varied, such as by diagnostic intrusive equivalence ratio testing and/or new engine purging. Before beginning these processes, a torque reserve may be created or increased to quickly offset decreases in engine output torque that result from leaning the air/fuel mixture during these processes.

The reserves/loads module 220 may also create or increase a torque reserve in anticipation of a future load, such as power steering pump operation or engagement of an air conditioning (A/C) compressor clutch. The reserve for engagement of the A/C compressor clutch may be created when the driver first requests air conditioning. The reserves/loads module 220 may increase the adjusted predicted torque request 263 while leaving the adjusted immediate torque request 264 unchanged to produce the torque reserve. Then, when the A/C compressor clutch engages, the reserves/loads module 220 may increase the adjusted immediate torque request 264 by the estimated load of the A/C compressor clutch.

The torque requesting module 224 receives the adjusted predicted and immediate torque requests 263 and 264. The torque requesting module 224 determines how the adjusted predicted and immediate torque requests 263 and 264 will be achieved. The torque requesting module 224 may be engine type specific. For example, the torque requesting module 224 may be implemented differently or use different control schemes for spark-ignition engines versus compression-ignition engines.

In various implementations, the torque requesting module 224 may define a boundary between modules that are common across all engine types and modules that are engine type specific. For example, engine types may include spark-ignition and compression-ignition. Modules prior to the torque requesting module 224, such as the propulsion torque arbitration module 206, may be common across engine types, while the torque requesting module 224 and subsequent modules may be engine type specific.

The torque requesting module 224 determines an air torque request 265 based on the adjusted predicted and immediate torque requests 263 and 264. The air torque request 265 may be a brake torque. Brake torque may refer to torque at the crankshaft under the current operating conditions.

Target values for airflow controlling engine actuators are determined based on the air torque request 265. More specifically, based on the air torque request 265, the air control module 228 determines a target wastegate opening area 266, a target throttle opening area 267, a target EGR opening area 268, a target intake cam phaser angle 269, and a target exhaust cam phaser angle 270. The air control module 228 determines the target wastegate opening area 266, the target throttle opening area 267, the target EGR opening area 268, the target intake cam phaser angle 269, and the target exhaust cam phaser angle 270 using model predictive control, as discussed further below.

The boost actuator module 164 controls the wastegate 162 to achieve the target wastegate opening area 266. For example, a first conversion module 272 may convert the target wastegate opening area 266 into a target duty cycle 274 to be applied to the wastegate 162, and the boost actuator module 164 may apply a signal to the wastegate 162 based on the target duty cycle 274. In various implementations, the first conversion module 272 may convert the target wastegate opening area 266 into a target wastegate position (not shown), and convert the target wastegate position into the target duty cycle 274.

The throttle actuator module 116 controls the throttle valve 112 to achieve the target throttle opening area 267. For example, a second conversion module 276 may convert the target throttle opening area 267 into a target duty cycle 278 to be applied to the throttle valve 112, and the throttle actuator module 116 may apply a signal to the throttle valve 112 based on the target duty cycle 278. In various implementations, the second conversion module 276 may convert the target throttle opening area 267 into a target throttle position (not shown), and convert the target throttle position into the target duty cycle 278.

The EGR actuator module 172 controls the EGR valve 170 to achieve the target EGR opening area 268. For example, a third conversion module 280 may convert the target EGR opening area 268 into a target duty cycle 282 to be applied to the EGR valve 170, and the EGR actuator module 172 may apply a signal to the EGR valve 170 based on the target duty cycle 282. In various implementations, the third conversion module 280 may convert the target EGR opening area 268 into a target EGR position (not shown), and convert the target EGR position into the target duty cycle 282.

The phaser actuator module 158 controls the intake cam phaser 148 to achieve the target intake cam phaser angle 269. The phaser actuator module 158 also controls the exhaust cam phaser 150 to achieve the target exhaust cam phaser angle 270. In various implementations, a fourth conversion module (not shown) may be included and may convert the target intake and exhaust cam phaser angles into target intake and exhaust duty cycles, respectively. The phaser actuator module 158 may apply the target intake and exhaust duty cycles to the intake and exhaust cam phasers 148 and 150, respectively. In various implementations, the air control module 228 may determine a target overlap factor and a target effective displacement, and the phaser actuator module 158 may control the intake and exhaust cam phasers 148 and 150 to achieve the target overlap factor and the target effective displacement.

The torque requesting module 224 may also generate a spark torque request 283, a cylinder shut-off torque request 284, and a fuel torque request 285 based on the predicted and immediate torque requests 263 and 264. The spark control module 232 may determine how much to retard the spark timing (which reduces engine output torque) from an optimum spark timing based on the spark torque request 283. For example only, a torque relationship may be inverted to solve for a target spark timing 286. For a given torque request ($T_{Req}$), the target spark timing ($S_T$) 286 may be determined based on:

$$S_T = f^{-1}(T_{Req}, APC, I, E, AF, OT, \#),$$

where APC is an air per cylinder, I is an intake valve phasing value, E is an exhaust valve phasing value, AF is an air/fuel ratio, OT is an oil temperature, and # is a number of activated cylinders. This relationship may be embodied as an equation and/or as a lookup table. The air/fuel ratio (AF) may be the actual air/fuel ratio, as reported by the fuel control module 240.

When the spark timing is set to the optimum spark timing, the resulting torque may be as close to a minimum spark advance for best torque (MBT spark timing) as possible. Best torque refers to the maximum engine output torque that is generated for a given air flow as spark timing is advanced, while using fuel having an octane rating greater than a predetermined octane rating and using stoichiometric fueling. The spark timing at which this best occurs is referred to as an MBT spark timing. The optimum spark timing may differ slightly from MBT spark timing because of, for example, fuel quality (such as when lower octane fuel is used) and environmental factors, such as ambient humidity and temperature. The engine output torque at the optimum spark timing may therefore be less than MBT. For example only, a table of optimum spark timings corresponding to different engine operating conditions may be determined during a calibration phase of vehicle design, and the optimum value is determined from the table based on current engine operating conditions.

The cylinder shut-off torque request 284 may be used by the cylinder control module 236 to determine a target number of cylinders to deactivate 287. In various implementations, a target number of cylinders to activate may be used. The cylinder actuator module 120 selectively activates and deactivates the valves of cylinders based on the target number 287.

The cylinder control module 236 may also instruct the fuel control module 240 to stop providing fuel for deactivated cylinders and may instruct the spark control module 232 to stop providing spark for deactivated cylinders. The spark control module 232 may stop providing spark to a cylinder once an fuel/air mixture that is already present in the cylinder has been combusted.

The fuel control module 240 may vary the amount of fuel provided to each cylinder based on the fuel torque request 285. More specifically, the fuel control module 240 may generate target fueling parameters 288 based on the fuel torque request 285. The target fueling parameters 288 may include, for example, target mass of fuel, target injection starting timing, and target number of fuel injections.

During normal operation, the fuel control module 240 may operate in an air lead mode in which the fuel control module 240 attempts to maintain a stoichiometric air/fuel ratio by controlling fueling based on air flow. For example, the fuel control module 240 may determine a target fuel mass that will yield stoichiometric combustion when combined with a present mass of air per cylinder (APC).

Figure 3:
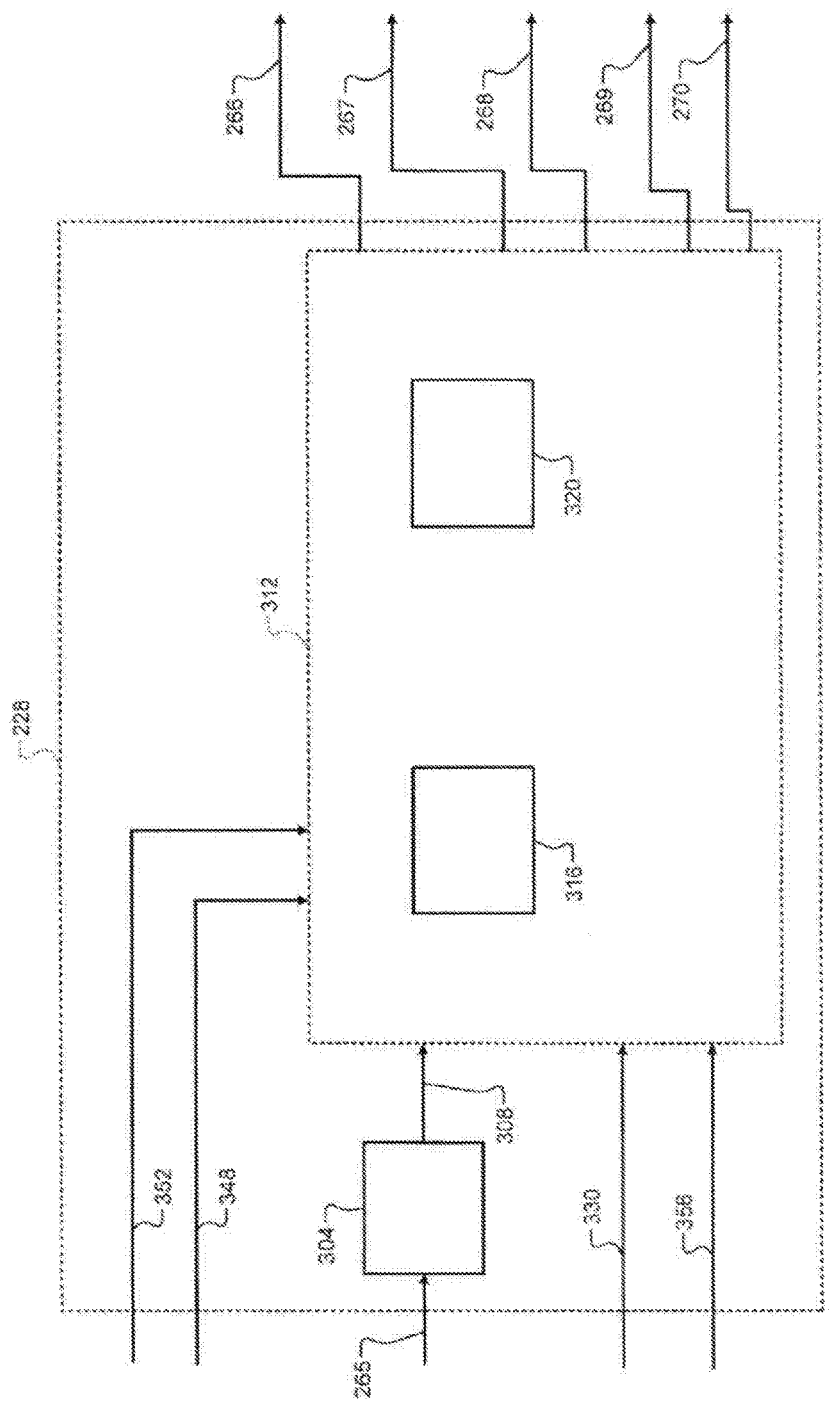
FIG. 3 is a functional block diagram of an example engine system according to an aspect of the present disclosure.

FIG. 3 is a functional block diagram of an example implementation of the air control module 228. Referring now to FIGS. 2 and 3, as discussed above, the air torque request 265 may be a brake torque. A torque conversion module 304 converts the air torque request 265 from brake torque into base torque. The torque request resulting from conversion into base torque will be referred to as a base air torque request 308.

Base torques may refer to torque at the crankshaft made during operation of the engine 102 on a dynamometer while the engine 102 is warm and no torque loads are imposed on the engine 102 by accessories, such as an alternator and the A/C compressor. The torque conversion module 304 may convert the air torque request 265 into the base air torque request 308, for example, using a mapping or a function that relates brake torques to base torques. In various implementations, the torque conversion module 304 may convert the air torque request 265 into another suitable type of torque, such as an indicated torque. An indicated torque may refer to a torque at the crankshaft attributable to work produced via combustion within the cylinders.

An MPC module 312 generates the target values 266-270 to achieve the base air torque request 308 using MPC (Model Predictive Control). The MPC module 312 includes a state estimator module 316 and an optimization module 320.

The state estimator module 316 determines states for a control loop based on a mathematical model of the engine 102, the states of the engine from a previous (e.g., last) control loop, and the target values 266-270 from the previous control loop. For example, the state estimator module 316 may determine the states for a control loop based on the relationships:

$$x(k)=Ax(k-1)+Bu(k-1)+B_v v(k-1); \text{ and}$$

$$y(k)=Cx(k),$$

where k is a k-th control loop, x(k) is a vector with entries indicative of states of the engine 102 for the k-th control loop, x(k−1) is the vector x(k) from the k−1th control loop, A is a matrix including constant values calibrated based on characteristics of the engine 102, B is a matrix including constant values calibrated based on characteristics of the engine 102, u(k−1) is a vector of including entries for the target values 266-270 used during the last control loop, y(k) is a linear combination of the vector x(k), C is a matrix including constant values calibrated based on characteristics of the engine 102, $B_v$ is a matrix including constant values calibrated based on characteristics of the engine, and v is a matrix including measured disturbances. Measured disturbances model include parameters that impact engine behavior but cannot be directly manipulated, such as ambient pressure and/or temperature. One or more of the state parameters may be adjusted based on measured or estimated values of those parameters, collectively illustrated by feedback inputs 330. The state estimator module 316 may determine the states, for example, using a Kalman filter or another suitable type of state estimator.

The functions performed by the MPC module 312 can be generally described as follows. For k=1, . . . , N, N being in integer greater than one, do:

(1) use the above equations and the feedback inputs 330 to obtain estimates of the states of the engine 102 at time
(2) calculate optimal values for the target values 266-270 for the time k to minimize a cost function during the period from the time k to a future time k+p; and
(3) set the target values 266-270 to the calculated optimal values for time k+1 only. Then return to (1) for the next control loop. The period between times k and k+p refers to a prediction horizon.

The cost function is the performance criterion to be minimized in the optimal control problem defined over the prediction horizon at each control loop. This function reflects the desired control goals. It may be, for example, the sum of different terms corresponding to tracking errors, for example, $\Sigma_i |(u(i)-u_{ref}(i))|^2$, for the manipulated variables to track some reference positions, $\Sigma_i |(y(i)-y_{ref}(i))|^2$, for the controlled variables to track some desired setpoint values, control effort, for example, $\Sigma_i |(u(i))|^2$ or $\Sigma_i |(\Delta u(i))|^2$, and a penalty term for constraint violation. More generally, the cost function depends on manipulated variables u, changes in the manipulated variables from the last control loop $\Delta u$, the controlled variables y, and constraint violation penalty variable $\epsilon$. The target values 266-270 may be referred to as manipulated variables and are denoted by the variable u. Predicted parameters may be referred to as controlled variables and may be denoted by the variable y.

An actuator constraint module 360 (FIG. 2) may set actuator constraints 348 for the target values 266-270. For example, the actuator constraint module 360 may set an actuator constraint for the throttle valve 112, an actuator constraint for the EGR valve 170, an actuator constraint for the wastegate 162, an actuator constraint for the intake cam phaser 148, and an actuator constraint for the exhaust cam phaser 150.

The actuator constraints 348 for the target values 266-270 may include a maximum value for an associated target value and a minimum value for that target value. The actuator constraint module 360 may generally set the actuator constraints 348 to predetermined operational ranges for the associated actuators. More specifically, the actuator constraint module 360 may generally set the actuator constraints 348 to predetermined operational ranges for the throttle valve 112, the EGR valve 170, the wastegate 162, the intake cam phaser 148, and the exhaust cam phaser 150, respectively. However, the actuator constraint module 360 may selectively adjust one or more of the actuator constraints 348 under some circumstances.

An output constraint module 364 (FIG. 2) may set output constraints 352 for the controlled variables (y). The output constraints 352 for the controlled variables may include a maximum value for that controlled variable and a minimum value for that controlled variable. The output constraint module 364 may generally set the output constraints 352 to predetermined ranges for the associated controlled variables, respectively. However, the output constraint module 364 may vary one or more of the output constraints 352 under some circumstances.

A reference module 368 (FIG. 2) generates reference values 356 for the target values 266-270, respectively. The reference values 356 include a reference for each of the target values 266-270. In other words, the reference values 356 include a reference wastegate opening area, a reference throttle opening area, a reference EGR opening area, a reference intake cam phaser angle, and a reference exhaust cam phaser angle. The reference module 368 may determine the reference values 356, for example, based on the air torque request 265, the base air torque request 308, and/or one or more other suitable parameters.

The optimization module 320 determines the target values 266-270 using a Dantzig quadratic programming (QP) solver. A QP solver solves an optimization problem with a quadratic cost function under inequality constraints. For example, if the vector $$x = \mathbb{R}^n$$

represents some optimization variables, quadratic functions of x can be put into the following form:

$$\frac{1}{2}x^T Q x - h^T x + \text{Constant},$$

where Q is an n× n constant symmetric positive definite matrix, Constant is a constant value, and where x is the actuator position over a prediction horizon. For example, assuming a system having a throttle actuator, wastegate actuator, exhaust camshaft actuator, intake camshaft actuator, and a control horizon of 3 at time k, then the vector x has size equal to 12. The throttle actuator, wastegate actuator, exhaust camshaft actuator, intake camshaft actuator at time k+1 occupy the first four components, and the same actuators occupy the next four components at future time k+2, and the same is true at future time k+3. In total, as indicated above, there are 12 components to vector x.

The optimization problem for model predictive control (MPC) has the following general form, minimize:

$$\frac{1}{2}x^T Q x - h^T x,$$

under the linear constraints $$Cx \leq d,$$

where $$h \in \mathbb{R}^n$$

h is a vector that is constant for each control loop, but can vary from control loop to control loop. Linear constraints are in the form of $$Cx \leq b,$$

where C is a constant matrix and b is a vector that is constant for each control loop, but can vary from control loop to control loop, and $$x \in \mathbb{R}^n,$$

$$Q \in \mathbb{R}^{n \times n},$$

$$C \in \mathbb{R}^{m \times n}, \text{ and}$$

$$d \in \mathbb{R}^m.$$

The use of superscript T denotes transpose usage.

The optimization module 320 also includes logic for determining actuator positions when the optimization module 320 fails to solve the MPC optimization problem. When the optimization module 320 fails to solve the MPC optimization problem, the optimization module ignores the linear constraints (i.e. ignores Cx≤d), and uses input constraints instead. That is, the optimization module 320 uses constraints x, where x is set to be greater than or less than a value that is specific to a given actuator. For example, if the optimization module 320 fails to determine an MPC optimized solution for a throttle actuator position, and the throttle actuator can move from 0°-90°, the optimization module 320 determines an unconstrained solution for the throttle actuator position, and then clips the unconstrained solution to the physical limits of the throttle actuator. That is, if the optimization module 320 determines the unconstrained solution for the throttle actuator position to be 120°, the solution is then clipped to the appropriate limit of the throttle actuator's physical range, i.e. 90°. Similarly, if the optimization module 320 determined the unconstrained solution for the throttle actuator position to be −15°, the unconstrained solution would be clipped to 0°. More generally, for a given control loop and a given actuator or plurality of actuators, if the optimization module 320 fails to solve the MPC optimization problem, the optimization module 320 uses the unconstrained solution clipped to the minimum or maximum constraints of the given actuator or plurality of actuators.

Figure 4:
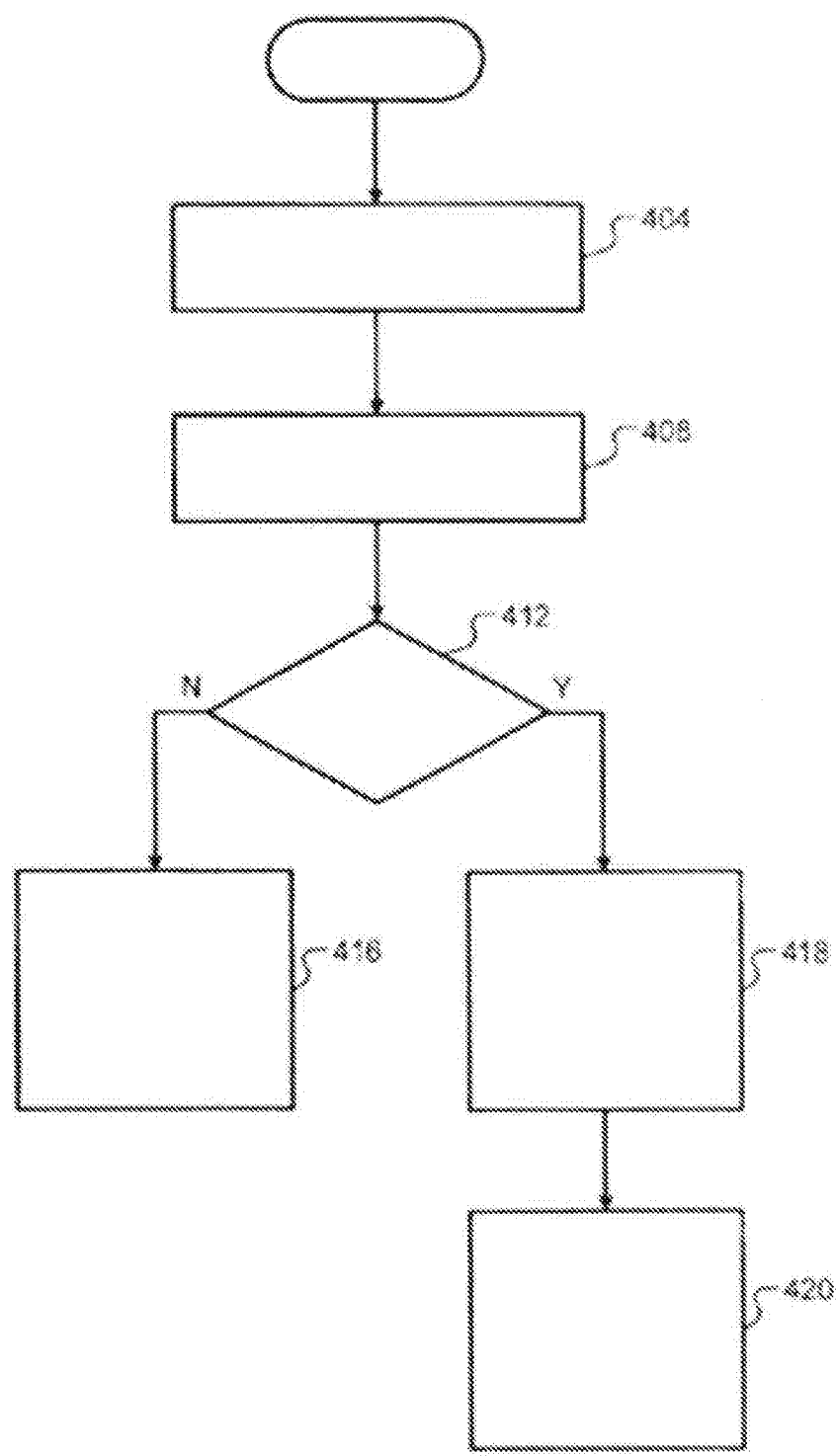
FIG. 4 is a flowchart depicting a method of controlling an actuator using model predictive control according to an aspect of the present disclosure.

FIG. 4 is a flowchart depicting an example method of solving the optimization problem and determining the target values 266-270 for a single control loop. At 404, the optimization module 320 iterates from the original unconstrained solution which is already available from the simplest solution of namely $Q^{-1}h$.

$$\frac{1}{2}x^T Q x - h^T x,$$

At 408, the optimization module 320 proceeds to run MPC calculations normally. At 412, the optimization module 320 determines whether MPC calculations have failed to generate a solution to the MPC optimization problem. If the solution to the MPC optimization problem has been found, no failure occurs, and the method proceeds to 416 where the solution to the MPC optimization problem is applied to the actuator system. However, if the MPC calculations have failed to generate a solution, the method proceeds to 418 where the original unconstrained solution is clipped to the input constraints. At 420, the original unconstrained solution clipped to the input constraints is applied to the actuator system. It should be noted that for each control loop the method of FIG. 4 is applied. Therefore, in some circumstances, the MPC solution may not be found for an indefinite number of control loops, while in other circumstances, the MPC solution may be found during a single control loop. While FIG. 4 is shown as ending after 420, FIG. 4 is illustrative of one control loop, and control loops may be executed at a predetermined rate.

Figure 5:
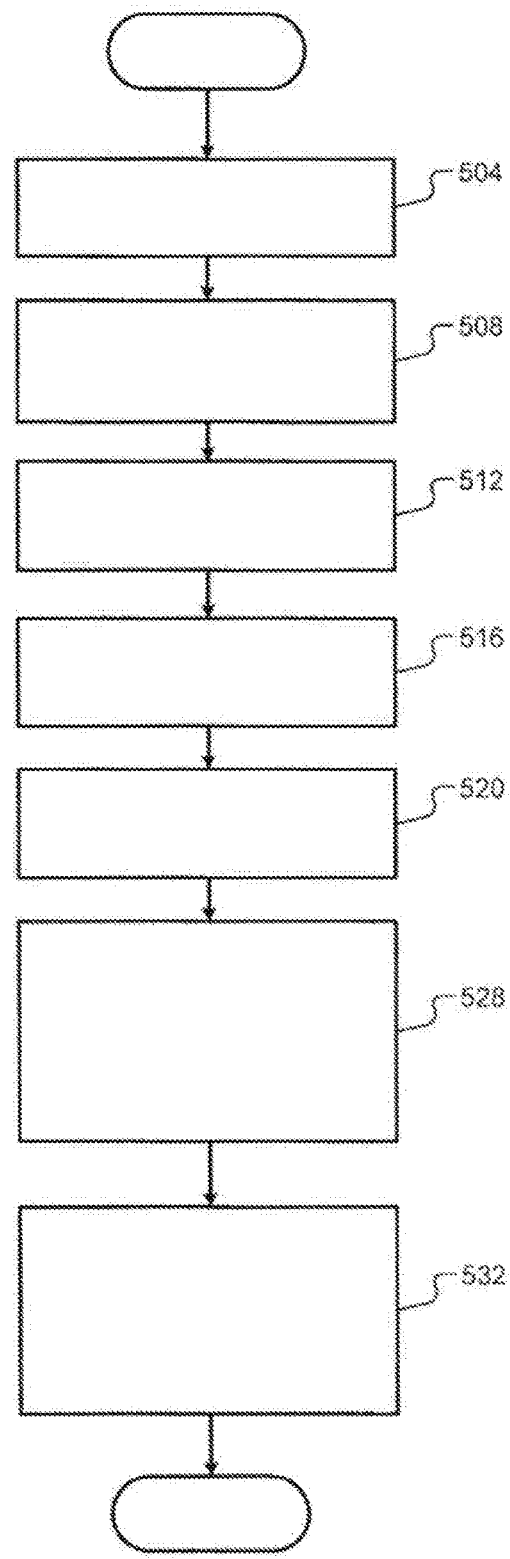
FIG. 5 is a flowchart depicting an example method of controlling a throttle valve, intake and exhaust valve actuation, and a wastegate of a turbo charger using model predictive control according to an aspect of the present disclosure.

Referring now to FIG. 5, a flowchart depicting an example method of estimating operating parameters and controlling the throttle valve 112, the intake cam phaser 148, the exhaust cam phaser 150, the wastegate 162 (and therefore the turbocharger), and the EGR valve 170 using MPC (model predictive control) is presented. Control may begin with 504 where the torque requesting module 224 determines the air torque request 265 based on the adjusted predicted and immediate torque requests 263 and 264. At 508, the torque conversion module 304 may convert the air torque request 265 into the base air torque request 308 or into another suitable type of torque for use by the MPC module 312. At 512, the state estimator module 316 determines the states of the engine 102 for the current control loop, as described above. The state estimator module 316 may determine the states, for example, using a Kalman filter.

At 516, the optimization module 320 solves the optimization problem to determine the target values 266-270, as described above. The optimization module 320 determines the target values 266-270 for the current control loop based on the target values 266-270 for the last control loop and the delta values of x*, respectively, at 520. For example only, the optimization module 320 determines the target values 266-270 by summing the delta values of x* with the target values 266-270 for the last control loop, respectively. Furthermore, if at 516 the optimization module 320 fails to find the optimal value of x*, the LQR solution, clipped to the input constraints for the current control loop will be sent to 520.

At 528, the first conversion module 272 converts the target wastegate opening area 266 into the target duty cycle 274 to be applied to the wastegate 162, the second conversion module 276 converts the target throttle opening area 267 into the target duty cycle 278 to be applied to the throttle valve 112. The third conversion module 280 also converts the target EGR opening area 268 into the target duty cycle 282 to be applied to the EGR valve 170 at 428. The fourth conversion module may also convert the target intake and exhaust cam phaser angles 269 and 270 into the target intake and exhaust duty cycles to be applied to the intake and exhaust cam phasers 148 and 150, respectively.

At 532, the throttle actuator module 116 controls the throttle valve 112 to achieve the target throttle opening area 267, and the phaser actuator module 158 controls the intake and exhaust cam phasers 148 and 150 to achieve the target intake and exhaust cam phaser angles 269 and 270, respectively. For example, the throttle actuator module 116 may apply a signal to the throttle valve 112 at the target duty cycle 278 to achieve the target throttle opening area 267. Also at 532, the EGR actuator module 172 controls the EGR valve 170 to achieve the target EGR opening area 268, and the boost actuator module 164 controls the wastegate 162 to achieve the target wastegate opening area 266. For example, the EGR actuator module 172 may apply a signal to the EGR valve 170 at the target duty cycle 282 to achieve the target EGR opening area 268, and the boost actuator module 164 may apply a signal to the wastegate 162 at the target duty cycle 274 to achieve the target wastegate opening area 266. While FIG. 5 is shown as ending after 532, FIG. 5 is illustrative of one control loop, and control loops may be executed at a predetermined rate.

A model predictive control system and method for increasing computational efficiency of the present disclosure offers several advantages. These include: improved engine response, reduced computational time between an engine torque request and an engine torque response, decreased driveline lash, improved NVH characteristics, and computational redundancy.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A method for controlling an actuator system of a motor vehicle, the method comprising:
   utilizing an actuator control system that provides a desired output for at least a first actuator of the actuator system;
   converting within a first conversion module the desired output to a desired first actuator position;
   converting within a second conversion module the desired first actuator position to a target first actuator position;
   utilizing a model predictive control (MPC) module with an MPC solver to determine optimal positions of a plurality of actuators subject to constraints;
   optimizing a cost function for a set of actuator duty cycles for controlling positions of the plurality of actuators;
   determining within a cost module a first cost for a first possible set of MPC target actuator duty cycle values;
   identifying within a control module optimal sets of target actuator motor duty cycle values for the MPC module;
   determining if the MPC solver has determined optimal actuator positions for the plurality of actuators;
   applying a linear quadratic regulator (LQR) solution if the MPC solver fails to determine optimal actuator positions for the plurality of actuators, and wherein the MPC module controls operation of an actuator duty cycle to achieve target actuator positions based on target actuator motor duty cycle values.

2. The method of claim 1 wherein the MPC solver solves a sequence of quadratic problems refining actuator movements over a control horizon for the plurality of actuators.

3. The method of claim 1 wherein the MPC module further includes a prediction module determining future state values of the plurality of actuators.

4. The method of claim 3 wherein optimizing a cost function further comprises minimizing an actuator performance criterion over a prediction horizon for each control loop.

5. The method of claim 1 wherein applying an LQR solution further comprises applying the LQR solution when the MPC solver fails to determine optimal actuator positions within a predetermined amount of time.

6. The method of claim 5 wherein the predetermined amount of time is approximately 25 ms.

7. The method of claim 1 wherein the MPC module further includes an optimization module setting multiple constraints including constraints for at least each of a throttle valve, an exhaust gas recycling (EGR) valve, a wastegate, an intake cam phaser, an exhaust cam phaser, of the plurality of actuators.

8. The method of claim 7 wherein the optimization module adjusts the multiple constraints to narrow operational ranges for the plurality of actuators when an LQR solution falls outside the operational ranges.

9. The method of claim 7 wherein the optimization module applies an LQR solution for a current control loop when the MPC solver fails to determine optimal actuator positions for the plurality of actuators.

10. The method of claim 7 wherein the optimization module applies the LQR solution for a future control loop when the MPC solver fails to determine optimal actuator positions for the plurality of actuators within the constraints for the plurality of actuators.

11. The method of claim 7 wherein the optimization module applies the LQR solution for a plurality of future control loops when the MPC solver fails to determine optimal actuator positions for the plurality of actuators within the constraints for the plurality of actuators.

12. A method for controlling an actuator system within a motor vehicle, the method comprising:
   utilizing an actuator control system that provides a desired output for at least a first actuator of the actuator system;
   converting within a first conversion module the desired output to a desired first actuator position;
   converting within a second conversion module the desired first actuator position to a target first actuator position;
   utilizing a model predictive control (MPC) module having an MPC solver that determines optimal first actuator positions based on a current position of the first actuator;
   determining within a prediction module future state values of the actuator control system using a mathematical model of the actuator system;
   determining within a cost module a first cost for a first possible set of MPC target actuator duty cycle values;
   identifying within a control module optimal sets of target actuator motor duty cycle values for the MPC module; and
   determining if the MPC solver has determined optimal actuator motor duty cycle values for the plurality of actuators; and
   applying a Linear Quadratic Regulator (LQR) solution for the target actuator motor duty cycle values if the MPC solver fails to determine optimal actuator motor duty cycles for the plurality of actuators, and wherein the MPC module controls operation of an actuator duty cycle to achieve target actuator positions based on target actuator motor duty cycle values.

13. The method of claim 12 wherein utilizing an MPC module further comprises determining a desired output for at least the first actuator.

14. The method of claim 12 wherein the MPC solver includes a Quadratic Programming (QP) solver and a Kalman filter.

15. The method of claim 12 wherein the applying a Linear Quadratic Regulator (LQR) solution further comprises applying the LQR solution when the MPC solver fails to determine optimal actuator positions within a predetermined amount of time.

16. The method of claim 12 wherein the MPC module further includes an optimization module setting multiple constraints including constraints for at least each of a throttle valve, an exhaust gas recycling (EGR) valve, a wastegate, an intake cam phaser, and an exhaust cam phaser, of the actuator system.

17. The method of claim 16 wherein the optimization module adjusts the constraints to narrow operational ranges for the plurality of actuators when an LQR solution falls outside the operational ranges.

18. The method of claim 16 wherein when the MPC solver fails to determine optimal actuator motor duty cycles for the plurality of actuators, the optimization module applies the LQR solution for one of: a current control loop, a single future control loop, or a plurality of future control loops.

19. The method of claim 12 wherein the MPC module further comprises a plurality of MPC controllers, and the actuator control system further comprises a plurality of actuators, and wherein each of the plurality of MPC controllers controls a distinct actuator of the plurality of actuators.

20. An actuator control system for a motor vehicle using model predictive control (MPC), the system comprising:
- an MPC module with an MPC solver having a first logic that determines current system constraints based on a current position of an actuator;
- the MPC solver having a second logic that determines a cost for a set of actuator duty cycles for controlling the position of the actuator;
- the MPC solver having a third logic that determines if the MPC solver has a solution for the current system constraints;
- the MPC solver having a fourth logic for applying a Linear Quadratic Regulator (LQR) solution if the MPC solver does not have a solution for the current system constraints; and
- the MPC solver having a fifth logic for constraining the LQR solution to physical and programmed limitations of the actuator system,
- wherein the MPC solver comprises a Kalman filter, and a quadratic programming (QP) problem solver.

* * * * *